United States Patent
Yamamoto et al.

(10) Patent No.: US 9,077,226 B2
(45) Date of Patent: Jul. 7, 2015

(54) MOTOR STRUCTURE HAVING CONNECTOR OR TERMINAL BLOCK TO WHICH CONDUCTIVELY CAULKED TERMINAL IS SOLDERED

(71) Applicant: FANUC Corporation, Minamitsuru-gun, Yamanashi (JP)

(72) Inventors: Tomonaga Yamamoto, Yamanashi (JP); Hidetoshi Uematsu, Yamanashi (JP); Yasuo Kawai, Yamanashi (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 0 days.

(21) Appl. No.: 13/803,669

(22) Filed: Mar. 14, 2013

(65) Prior Publication Data
US 2013/0264898 A1    Oct. 10, 2013

(30) Foreign Application Priority Data

Apr. 6, 2012  (JP) .................................. 2012-087647

(51) Int. Cl.
*H02K 3/50* (2006.01)
*H02K 5/22* (2006.01)
(52) U.S. Cl.
CPC . *H02K 3/50* (2013.01); *H02K 5/225* (2013.01)
(58) Field of Classification Search
USPC ......... 310/71, 68 A–68 E; 439/874, 877, 878, 439/82, 83
See application file for complete search history.

(56) References Cited

U.S. PATENT DOCUMENTS

| | | | |
|---|---|---|---|
| 4,010,538 A * | 3/1977 | O'Keefe et al. ................ 29/865 |
| 4,131,332 A * | 12/1978 | Hogendobler et al. ....... 439/585 |
| 4,913,678 A * | 4/1990 | Avellino et al. .............. 439/879 |
| 5,304,880 A * | 4/1994 | Hisada et al. .................... 310/71 |
| 5,432,995 A * | 7/1995 | Takenami et al. ............... 29/753 |
| 5,653,601 A * | 8/1997 | Martucci et al. ............... 439/82 |
| 6,030,260 A | 2/2000 | Kikuchi et al. |
| 6,369,474 B1 * | 4/2002 | Tanaka et al. .................. 310/71 |
| 6,808,416 B2 * | 10/2004 | Fegley et al. ................. 439/585 |
| 7,597,596 B2 * | 10/2009 | Watanabe ..................... 439/877 |
| 7,851,955 B2 * | 12/2010 | Yamamoto et al. ............ 310/71 |
| 2004/0227417 A1 | 11/2004 | Yamamoto et al. |
| 2005/0250356 A1 * | 11/2005 | Matsumura et al. ........... 439/82 |
| 2006/0194484 A1 * | 8/2006 | Lai et al. ....................... 439/874 |

(Continued)

FOREIGN PATENT DOCUMENTS

| | | |
|---|---|---|
| JP | 11-150904 | 6/1999 |
| JP | 11-150904 A | 6/1999 |

(Continued)

*Primary Examiner* — Naishadh Desai
(74) *Attorney, Agent, or Firm* — Drinker Biddle & Reath LLP

(57) ABSTRACT

A motor structure capable of easily conserving space, being low cost and having few components, while utilizing a connecting method using conductive caulking. In a motor structure, a winding wire is wound onto a stator core, a terminal member is attached to one end of the winding wire by conductive caulking, and the terminal member is directly connected to a connector by soldering. The terminal member has a wire receiving portion which receives one end of each of at least one winding wire, and a connecting portion which may be directly connected to the connector or a terminal block by soldering. The wire receiving portion is a generally cylindrical member, and the connecting portion is a rod member which may be inserted into a connecting hole of the connector.

15 Claims, 7 Drawing Sheets

(56) References Cited

U.S. PATENT DOCUMENTS

| | | | |
|---|---|---|---|
| 2008/0290978 A1* | 11/2008 | Yamamoto et al. | 336/192 |
| 2008/0293280 A1* | 11/2008 | Kennedy et al. | 439/274 |
| 2009/0315419 A1 | 12/2009 | Mita et al. | |

FOREIGN PATENT DOCUMENTS

| | | |
|---|---|---|
| JP | 2000-069705 | 3/2000 |
| JP | 2000-069705 A | 3/2000 |
| JP | 2004-343831 | 12/2004 |
| JP | 2004-343831 A | 12/2004 |
| JP | 2008-295213 | 12/2008 |
| JP | 2008-295213 A | 12/2008 |
| JP | 2009-030300 | 2/2009 |
| JP | 2009-303300 A | 12/2009 |
| JP | 2010-3439 | 1/2010 |
| JP | 2010-110168 | 5/2010 |
| JP | 2010-110168 A | 5/2010 |

* cited by examiner

MOTOR STRUCTURE HAVING CONNECTOR OR TERMINAL BLOCK TO WHICH CONDUCTIVELY CAULKED TERMINAL IS SOLDERED

RELATED APPLICATION DATA

This application claims priority under 35 U.S.C. §119 and/or §365 to Japanese Application No. 2012-087647 filed Apr. 6, 2012, the entire contents of which is incorporated herein by reference.

BACKGROUND OF THE INVENTION

1. Field of the Invention

The present invention relates to a motor structure having a connector or terminal block, to which a conductively caulked terminal is connected.

2. Description of the Related Art

In a motor structure wherein a wire is wound onto a stator core and an end of the wire is connected to a terminal block or a connector, many man-hours are necessary to remove a wire coating. As a technique for reducing the man-hours for removing the coating, conductive caulking may be used. Conductive caulking is a manufacturing technique, wherein a wire is covered by a terminal and large current is applied to the terminal so that a coating of the wire is evaporated by heat. For example, Japanese Unexamined Patent Publication (Kokai) No. 2004-343831 discloses an electric motor, and describes that "ends of lead wires 21U, 21V and 21W of each phase of a stator coil in electric motor 20 are connected to ends of conductive members 12U, 12V and 12W corresponding to each phase of relay member 10 by means of conductive caulking member 22."

Japanese Unexamined Patent Publication (Kokai) No. 2009-303300 discloses a three-phase electric motor and describes that "as shown in FIG. 2(a), one coil lead wire B1 is inserted into butt terminal 31 from one end thereof. Then, by using conductive caulking machine 40, butt terminal 31 is caulked so that lead wire B1 is fixed to butt terminal 31 (see calked mark 31b). Next, corresponding connector lead wire A1 is inserted into butt terminal 31 from the other end thereof. Lead wire A1 is inserted until lead wire Al abuts lead wire B2 within butt terminal 31. By virtue of this, lead wire A1 is electrically communicated with lead wire B1."

Japanese Unexamined Patent Publication (Kokai) No. 2010-110168 discloses a terminal connecting method and apparatus wherein the connection between a coil end and a terminal is automated, and describes that "conductive caulking device 138 is a robot having a multi-joint arm, and movable electrode 138a and fixed electrode 138b for conductive caulking are arranged on a front end of the arm. Conductive caulking device 138 carries out conductive caulking by clamping terminal 210 between movable electrode 138a and fixed electrode 138b and applying current to the electrodes."

Japanese Unexamined Patent Publication (Kokai) No. 2000-69705 discloses a stator of a rotating electric machine and describes that "the other end of common-mode coil connecting wire 24 is inserted into annular portion 28a of one phase terminal 28, as shown in FIG. 2, and is connected and fixed by crimping, ultrasonic welding or conductive caulking. In the case of FIG. 1, two common-mode coils 18a and two common-mode coils 18b (i.e., four coils) are provided. Ring portion 28a of phase terminal 28 is fixed to a corresponding terminal of power cable terminal block 20 (for example, U-phase terminal 20a) by means of a fixing means such as a screw, after coil 18a (18b) is inserted into slot 16a of stator core 16."

On the other hand, a technique for conserving space and the number of components has been disclosed. For example, Japanese Unexamined Patent Publication (Kokai) No. 11-150904 discloses a stator connecting terminal and describes that "in FIGS. 6 to 8, first connecting terminal $45_1$ is formed by conductive metal, wherein outer wire connecting terminal potion 48 which is inserted into and fixed to first fitting hole $39_1$ so that one end of the portion projects from first fitting hole $39_1$, flat connecting plate portion 49 having one end which is vertically connected to the other end of terminal portion 48, and coil connecting terminal portion 50 connected to the other end of plate portion 49, are integrally constituted. Before first connecting terminal $45_1$ is assembled to stator 21, coil connecting terminal portion 50 is vertically connected to connecting plate portion 49 and extends in the direction opposed to terminal portion 48 (i.e., the direction away from bobbin 34 when terminal portion 48 is inserted into first fitting hole $39_1$). In this regard, coil connecting terminal portion 50 may be bent so as to overlap connecting plate portion 49."

Further, Japanese Unexamined Patent Publication (Kokai) No. 2008-295213 discloses a structure and method for motor coil connection and describes that "FIG. 1 shows an example of a coil connecting structure which is one embodiment of the present invention. Conductors 11 are formed of a conductively caulkable material such as copper. One end of each conductor 11 is formed into the shape of a terminal as a terminal-shaped portion 10, and the other end is mounted on power input section (connector) 12. Conductors 11 are formed so as to conform to the shape of coil ends of a stator coil and maintain that shape, and therefore conductors 11 do not protrude outside the electric motor."

In Japanese Unexamined Patent Publication (Kokai) No. 2004-343831, the lead wire of the stator coil and the conductive member are inserted into the sleeve-shaped conductive caulking member while being overlapped with each other, and the lead wire is connected to the connector by means of the relay member having the conductive member. In Japanese Unexamined Patent Publication (Kokai) No. 2009-303300, one end of the coil lead wire and one end of the connector lead wire are electrically connected by conductive caulking within the butt terminal, and the other end of the connector lead wire is connected to the connector. Further, in Japanese Unexamined Patent Publication (Kokai) No. 2010-110168, the robot having the multi-joint arm carries out conductive caulking so as to automate the connection between the coil end and the terminal.

However, none of Japanese Unexamined Patent Publication (Kokai) No. 2004-343831, Japanese Unexamined Patent Publication (Kokai) No. 2009-303300 and Japanese Unexamined Patent Publication (Kokai) No. 2010-110168 explains the connecting manner between the terminal conductively caulked at the coil side and the connector or the terminal block. Further, in Japanese Unexamined Patent Publication (Kokai) No. 2000-69705, the ends of the plurality of coils are conductively caulked to the round terminal, and the round terminal is connected to the terminal block. However, the round terminal is connected to the terminal block by means of a screw. As described above, in the conventional method, a large space may be necessary for the screw connection of the caulked terminal, layout of the coil and/or the lead wire, and the insulation between the components, etc. In addition, when the relay member is used, the number of the components may be increased.

On the other hand, it could be understood that the technique in Japanese Unexamined Patent Publication (Kokai) No. 11-150904 is intended to provide the special and bendable structure to the connecting terminal so that the space may be conserved by bending the connecting terminal after the lead wire is conductively caulked, on the ground that it is necessary to position the connecting terminal at a distance from the coil having the core in order to carry out the conductive caulking of the lead wire. Further, it could be understood that the technique in Japanese Unexamined Patent Publication (Kokai) No. 2008-295213 is intended to conserve the space by using the special integrated connector having the insulating member and the conductor. However, such a specially structured terminal or integrated connector may be expensive.

SUMMARY OF THE INVENTION

The object of the present invention is to provide a motor structure capable of easily conserving space, being low cost and having few components, while utilizing a connecting method using conductive caulking.

The present invention provides a motor structure having a motor wherein a winding wire is wound onto a stator core and an end of the winding wire is connected to a connector or a terminal block, wherein a terminal member attached to the end of the winding wire is directly connected to the connector or the terminal block by soldering, and wherein the terminal member has a wire receiving portion at one end thereof and a connecting portion at the other end thereof, the end of the winding wire is received in the wire receiving portion and is fixed by conductive caulking, and the connection portion is directly connected to the connector or the terminal block.

In a preferred embodiment, the connecting portion of the terminal member is a rod portion, and the connector or the terminal block has a hole portion into which the rod portion may be inserted so that the rod portion is inserted into the hole portion and soldered.

In a preferred embodiment, a shape of a radial cross-section of the rod portion of the terminal member is non-circular.

In a preferred embodiment, the terminal member is oriented so that the terminal member is separated from a peripheral member by a predetermined distance or more, or, the terminal member is oriented so that the terminal member is separated from a peripheral member by a predetermined distance or more and soldering of the terminal member is facilitated.

In a preferred embodiment, the hole portion of the connector or the terminal block has a cylindrical shape, and the radial cross-section of the rod portion of the terminal member partially corresponds to a radial cross-section of the hole portion as a circumscribing circle of the rod portion so that a gap is formed between the hole portion and the rod portion inserted into the hole portion.

In a preferred embodiment, the hole portion of the connector or the terminal block has a counterbore at an open end thereof, a diameter of which is larger than a diameter of the hole portion.

In a preferred embodiment, the hole portion of the connector or the terminal block has a rotation-stopping structure configured to not be rotated with the terminal member soldered to the hole portion.

BRIEF DESCRIPTION OF THE DRAWINGS

The above and other objects, features and advantages of the present invention will be made more apparent by the following description of the preferred embodiments thereof, with reference to the accompanying drawings, wherein.

DETAILED DESCRIPTION

Figure 1:
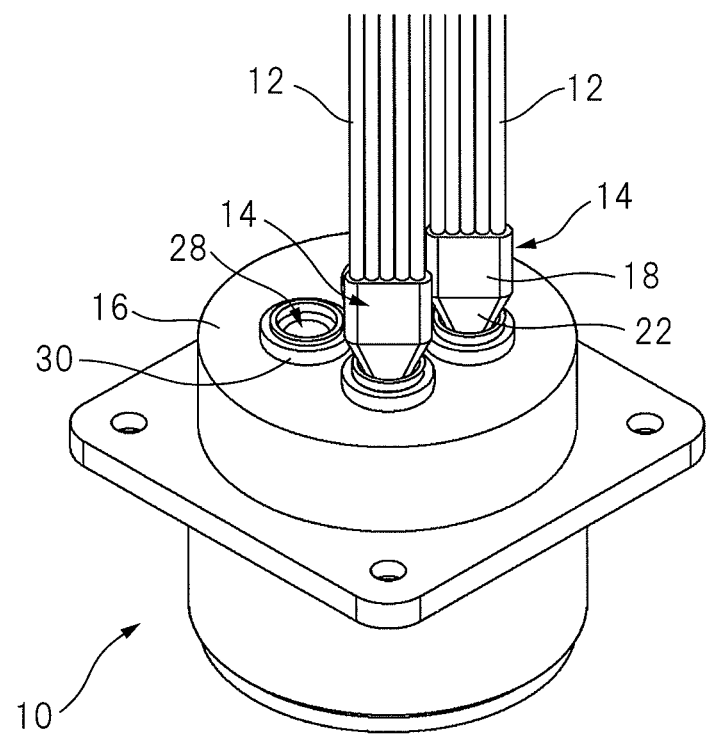
FIG. 1 is a perspective view showing a motor structure according to a first embodiment of the invention.

FIG. 1 is a perspective view showing a basic configuration of a motor structure according to a first embodiment of the invention. In motor structure 10, a winding wire 12 is wound onto a stator core (not shown), a terminal member 14 is attached to one end of winding wire 12 by conductive caulking, and terminal member 14 is directly connected to a connector 16 by soldering.

Figure 2:
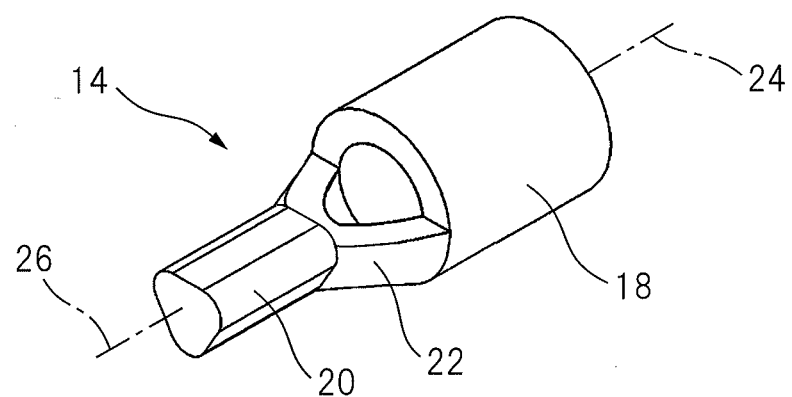
FIG. 2 shows an example of a terminal member attached to an end of a winding wire.

FIG. 2 is a view showing one embodiment of terminal member 14 before the conductive caulking. Terminal member 14 has a wire receiving portion 18 which receives one end of each of at least one (five in the embodiment of FIG. 1) winding wire 12, and a connecting portion 20 which may be directly connected to connector 16 or a terminal block (as described below) by soldering. In the embodiment of FIG. 2, wire receiving portion 18 is a generally cylindrical member, and connecting portion 20 is a rod member which may be inserted into a connecting hole of connector 16. Although wire receiving portion 18 may be directly connected to rod portion 20, it is preferable that they are connected to each other via a tapered portion 22 as shown. Further, it is preferable that a center axis 24 of wire receiving portion 18 and a center axis 26 of rod portion 20 are parallel to each other but do not coincide with each other (i.e., are offset from each other). In addition, terminal member 14 may be easily manufactured by a method wherein one plate member is punched into a certain shape and the punched member is rolled.

Figure 3:
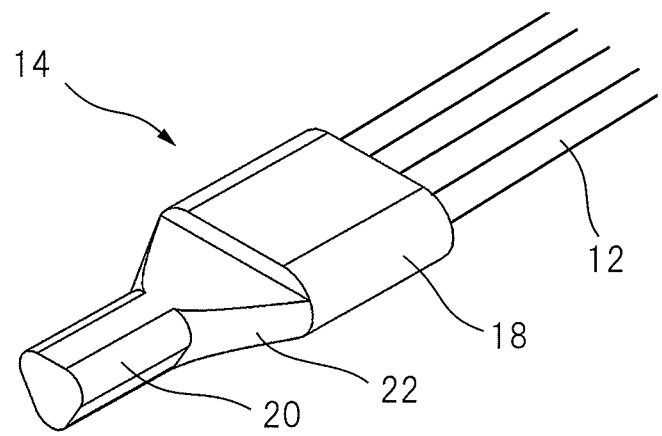
FIG. 3 shows a state wherein the terminal member is conductively caulked.

FIG. 3 is a view showing a state wherein winding wire 12 is inserted into wire receiving portion 18 of terminal member 14 of FIG. 2, and winding wire 12 and terminal member 14 are connected by conductive caulking. As shown in FIG. 3, wire receiving portion 18 is collapsed in the radial direction thereof by the conductive caulking so that received winding wire 12 is assuredly fixed. Such conductive caulking operation may be carried out at a place which is separated from connector 16 or a terminal block as described below. Further, by means of tapered portion 22 as described above, the size of the caulked structure is smoothly increased from wire receiving portion 18 to rod portion 20, whereby the strength of terminal member 14 may be improved.

Figure 4:
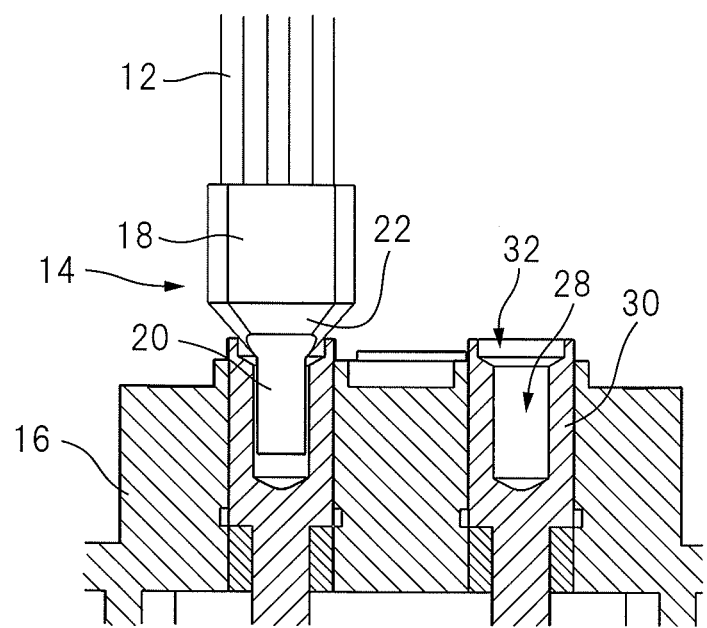
FIG. 4 is a partial cross-sectional view of the motor structure of FIG. 1.

FIG. 4 is a partial enlarged view of a connecting portion between terminal member 14 and connector 16. Terminal member 14, which is conductively caulked as shown in FIG. 3, is directly connected to connector 16 by soldering. In detail, a hole portion 28 capable of receiving rod portion 20 of terminal member 14 is formed on connector 16, and rod portion 20 is inserted into hole portion 28 and soldered thereto. In the illustrated embodiment, a member (or solder cup) 30 having hole portion 28 is arranged on connector 16, the number of which is the same as the number of the terminal members to be connected to connector 16 (in the illustrated embodiment, four solder cups are arranged).

Since the conductive caulking operation of terminal member 14 and winding wire 12 may be carried out at the place separated from connector 16 or the terminal block, heat generated by the conductive caulking is not transferred to connector 16 or the terminal block. Therefore, a portion (e.g., resin portion) of connector 16 or the terminal block, which has a low melting point, can be prevented from melting, and further, a coating on a current-carrying portion of connector 16 or the terminal block can be prevented from being oxidized, whereby reliability of the motor may be improved. In addition, by directly soldering terminal member 14 to connector 16 or the terminal block, the number of connection components may be reduced.

As described above, a portion of terminal member 14 opposed to the wire-inserting side is formed as rod portion 20, hole portion 28 is formed on connector 16 or the terminal block, and rod portion 20 is inserted into and soldered to hole portion 28. By virtue of this, the terminal member may be easily connected to the connector or the terminal block by using the structure (referred to as the solder cup) adapted for soldering.

The shape of a portion of the terminal member 14 connected to connector 16 may be arbitrarily designed as long as the portion can be directly connected to the connector by soldering. However, as shown in FIG. 2, it is preferable that a radial cross-section of rod portion 20 of terminal member 14 is non-circular. For example, rod portion 20 of terminal member 14 of FIG. 2 has a generally triangular cross-section (more particularly, a triangle having rounded corners). Due to such a configuration, when the center axes of wire receiving portion 18 and rod portion 20 are offset from each other, the positional relationship between rod portion 20 and wire receiving portion 18 which is flattened by the conductive caulking may be always constant. In other words, in the case that the conductive caulking is automatically carried out by using a robot, etc., an angular position about the center axis of the rod portion (or the terminal member) to be gripped cannot be determined when the rod portion has a simple column shape, whereby the positional relationship between the rod portion and the flattened wire receiving portion may be different between each terminal member. However, when the rod portion has a polygonal column shape, the orientation (or the angular position) of the terminal member can be constant by utilizing a plane of the polygonal column shape, whereby the positional relationship between the rod portion and the wire receiving portion after the conductive caulking can be constant. Further, when the positional relationship between the rod portion and the wire receiving portion is constant, the plurality of terminal members may have the same shape. Therefore, even when a distance between each hole 28 is relatively small as shown in FIG. 1, wire receiving portions 18 do not interfere with each other.

Figure 5:
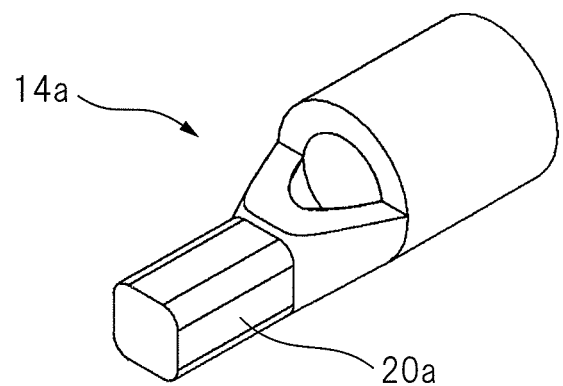
FIG. 5 shows another example of a terminal member attached to the end of the winding wire.
Figure 6:
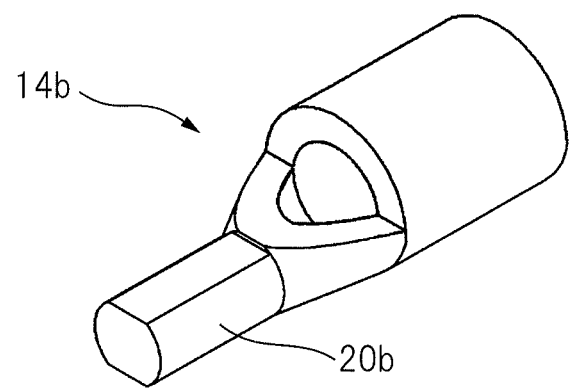
FIG. 6 shows still another example of a terminal member attached to the end of the winding wire.

Although FIG. 2 shows a triangular prism as an example wherein rod portion 20 does not have a column shape, another shape may be used for the rod portion. For example, FIG. 5 shows rod portion 20a of terminal member 14a having a generally square prism, i.e., a cross-section of which is generally square (more particularly, a square having rounded corners). On the other hand, FIG. 6 shows rod portion 20b of terminal member 14b having a column shape, a part of which is planarly cut-off or removed along the axial direction thereof. In other words, a cross-section of rod portion 20b has a generally circular shape, a part of which (in the illustrated embodiment, two portions radially opposed to each other) is linearly cut-off or removed.

Figure 7:
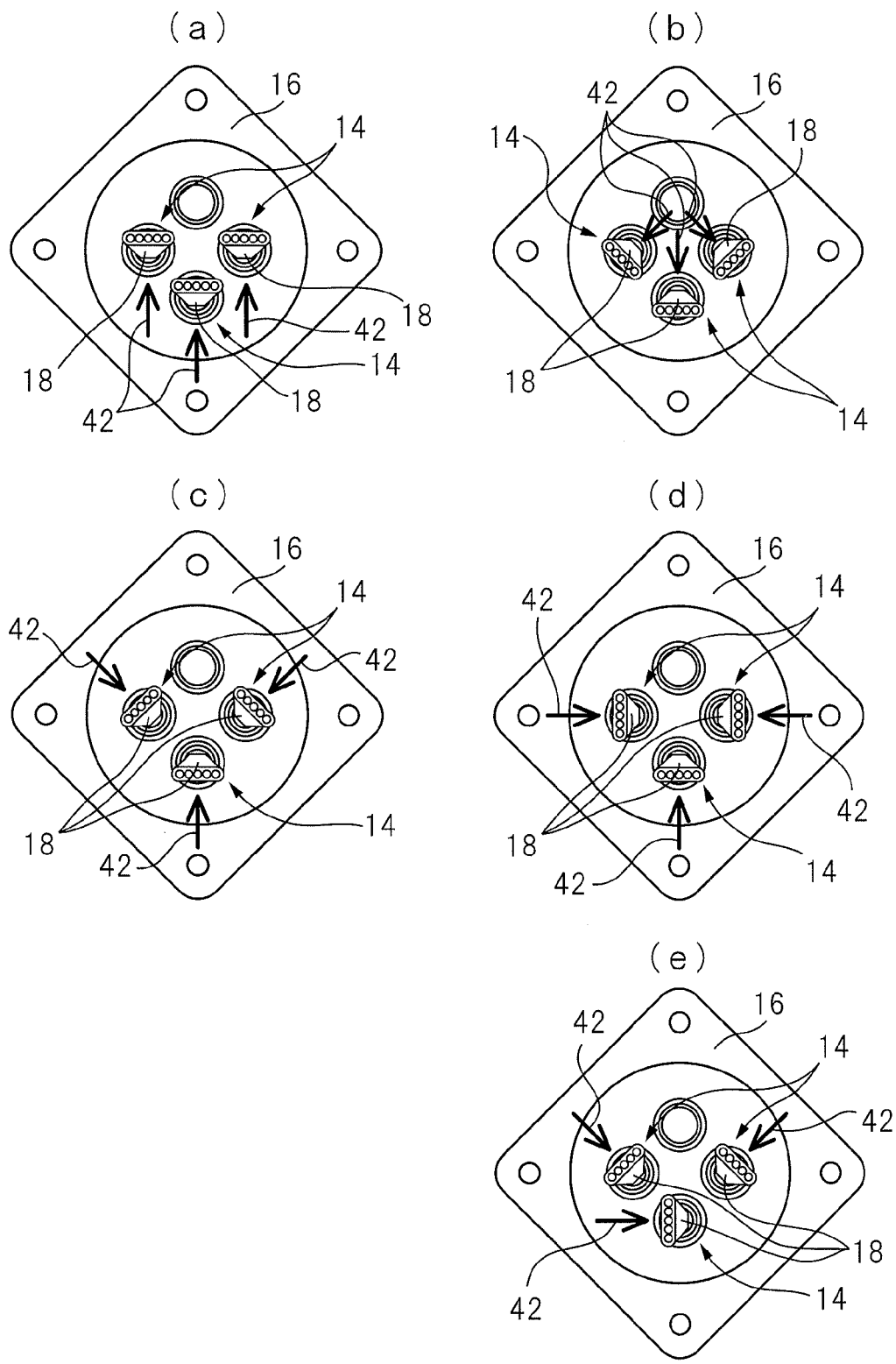
FIG. 7 shows an example of positioning of the terminal member of the first embodiment.

Sections (a) to (c) of FIG. 7 are top views of connector 16, showing examples of positioning of terminal member 14 of the invention. In FIG. 7, terminal member 14 is oriented so that the terminal member is separated from a peripheral member by a predetermined distance or more, or, terminal member 14 is oriented so that the terminal member is separated from a peripheral member by a predetermined distance or more and soldering of terminal member 14 is facilitated. Concretely, neighboring terminal members 14 are separated from each other by a predetermined distance or more, and the orientation of wire receiving portion 18 after the conductive caulking of terminal member 14 is varied. Due to such configurations, a necessary distance for insulating terminal members 14 from each other, or a necessary distance for insulating terminal member 14 from a housing to which the connector is connected, may be obtained. In particular, in sections (a) and (b), a movement path (indicated by an arrow 42) of a soldering iron used to solder each terminal member is close to each other, whereby an amount of movement of the soldering iron may be reduced and the terminal member may be effectively soldered.

When the cross-section of the terminal member is non-circular as shown in FIGS. 2, 5 and 6 and hole portion 28 of connector 16 is cylindrical, the rod portion of the terminal member may be inserted into the hole portion while reducing a backlash between them. Concretely, the radial cross-section of the rod portion of the terminal member partially corresponds to the radial cross-section of hole portion 28 (i.e., the circle) as a circumscribing circle of the rod portion. In other words, rod portions 20, 20a and 20b, as shown in FIGS. 2, 5 and 6, have the cross-sections wherein three, four or two circumferential portions are cut-off from the circle corresponding to the cross-section of hole portion 28, respectively. By virtue of this, the rod portion may be inserted into the hole portion without backlash by contacting the uncut portion of the rod portion to the inner surface of the hole portion. Further, since a certain gap is formed between the inner surface of the hole portion and the cut-off portion of the rod portion after the insertion, a solder can easily flow within the hole portion, whereby the soldering may be properly carried out without enclosing air within the hole portion.

In addition, as shown in FIG. 4, it is preferable that the diameter of hole portion 28 at an open end thereof is enlarged, concretely, a counterbore 32 is formed on solder cup 30 at the open end thereof, a diameter of which is larger than the diameter of hole portion 28. By virtue of this, counterbore 32 may retain melted solder, whereby the solder is prevented from flowing out of solder cup 30. Since the solder contacts both terminal member 14 and solder cup 30, heat can be easily transferred between them, and then a soldering condition such as a heating time of the components to be soldered and/or a flow rate of the solder can be easily controlled, whereby the soldering may be easily carried out.

Figure 8:
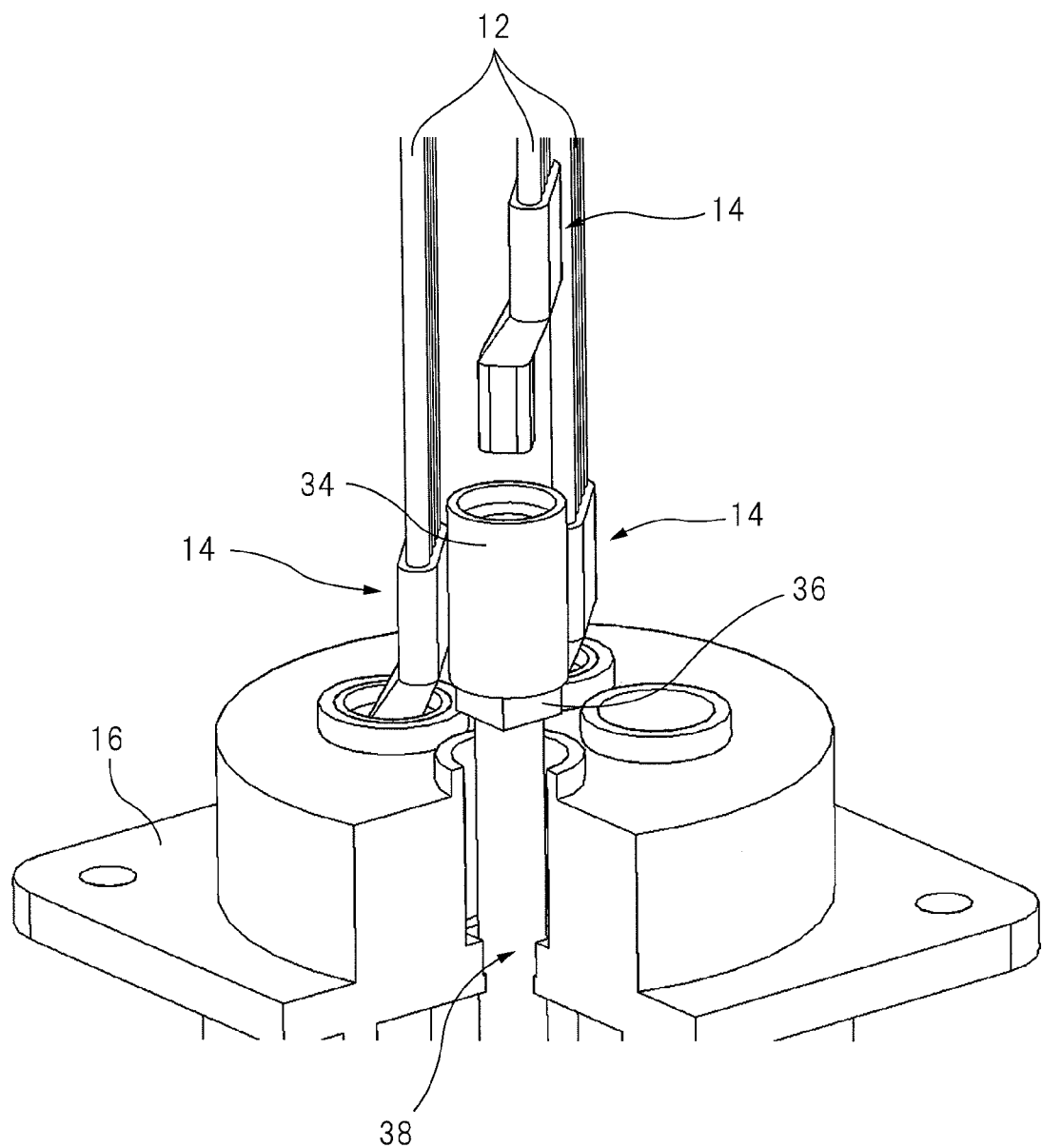
FIG. 8 shows an example of a rotation-stopping structure for avoiding simultaneous rotation of the terminal member and the hole portion after soldering.

FIG. 8 shows an example of a rotation-stopping structure for avoiding simultaneous rotation of the terminal member and the hole portion after soldering the terminal member. Concretely, in order to avoid that the orientation of terminal member 14 is changed by the simultaneous rotation of terminal member 14 and hole portion 28 after the soldering, a convex portion 36, which does not have a simple cylindrical shape, is formed on a sleeve member 34 having hole portion 28, and a concave portion 38, which has a generally complementary shape to convex portion 36, is formed on the side of connector 16 into which sleeve member 34 is inserted, so that the simultaneous rotation is avoided by fitting convex portion 36 with concave portion 38. For example, convex portion 36 has a polygonal column shape such as a square column shape, and concave portion 38 has a hollow portion having the polygonal or square column shape. By virtue of such a rotation-stopping structure, even when a force for rotating terminal member 14 relative to hole portion 28 is applied to winding wire 12, the simultaneous rotation of the terminal member and the hole portion may be avoided.

Figure 9:
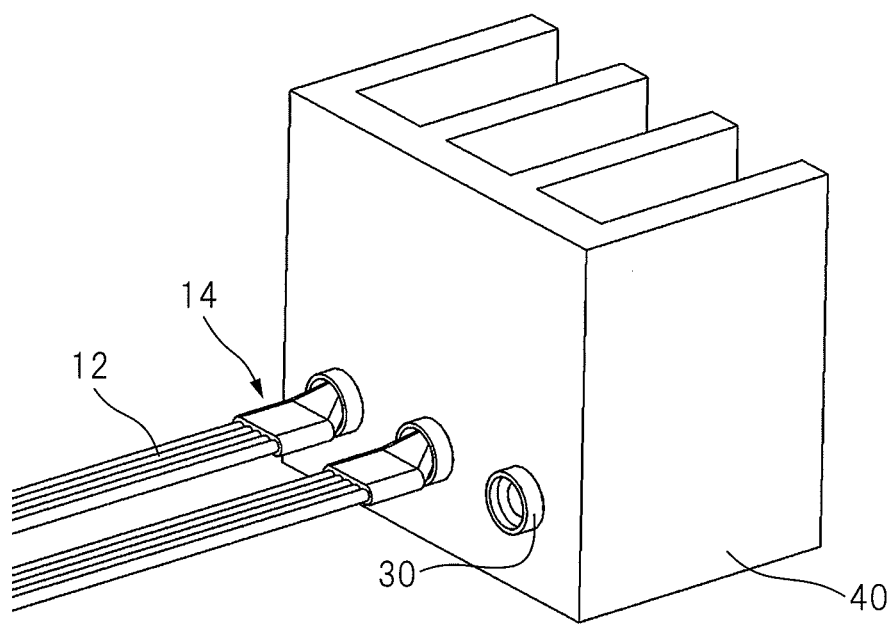
FIG. 9 is a perspective view showing a motor structure according to a second embodiment of the invention.

FIG. 9 shows a motor structure according to a second embodiment of the invention. Concretely, terminal member 14 is connected to terminal block 40, not to connector 16. Terminal block 40 has solder cup 30, similarly to connector 16, and the connection manner of terminal member 14 may be the same as that of FIG. 1, and thus a detailed explanation thereof will be omitted. Although terminal member 14 is connected to terminal block 40 in the lateral direction in FIG. 9, it is preferable that, when the soldering operation is carried out, the orientation of the terminal block is changed so that terminal member 14 is connected to solder cup 30 from the above.

Figure 10:
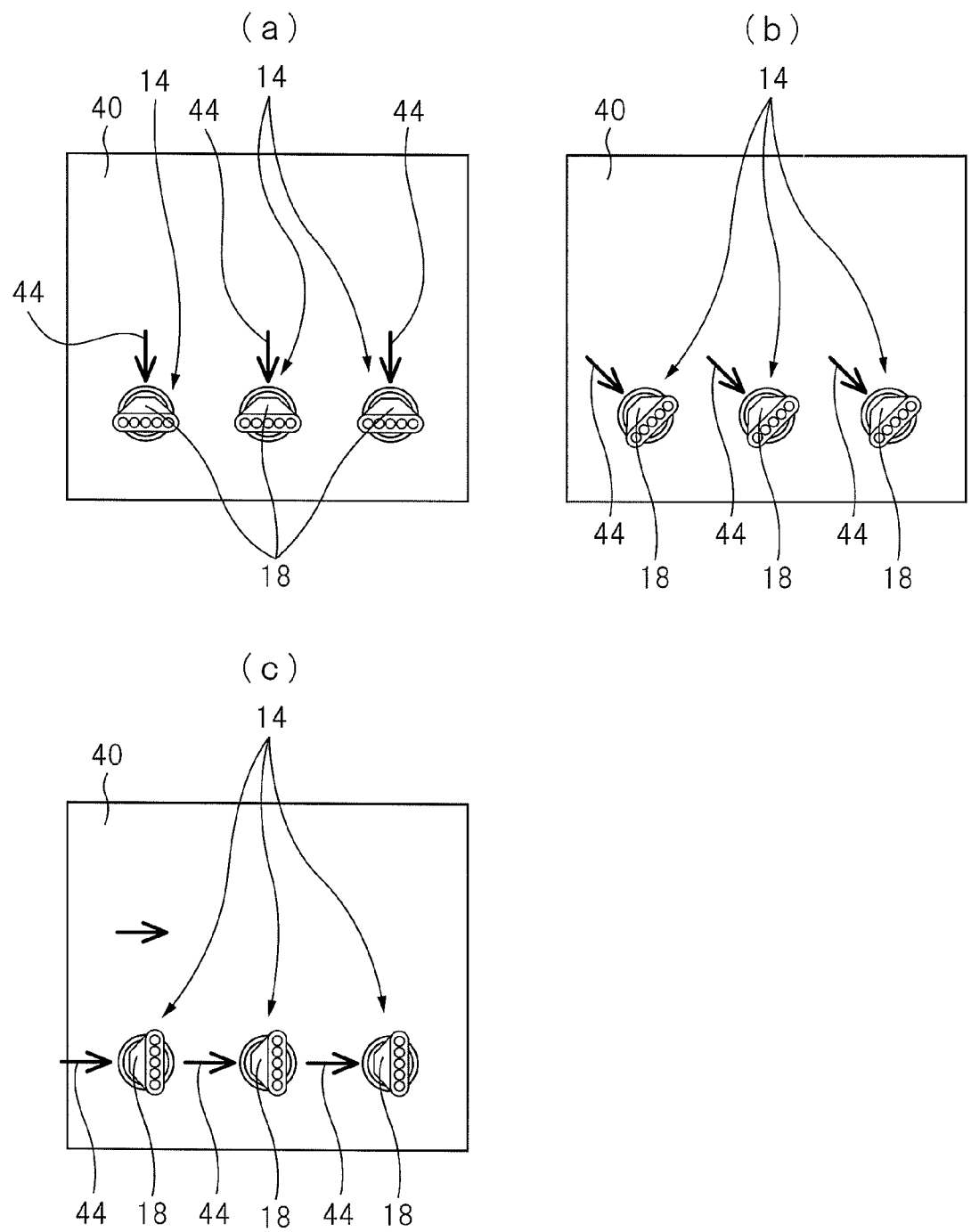
FIG. 10 shows an example of positioning of the terminal member of the second embodiment.

Sections (a) to (c) of FIG. 10 are front views terminal block 40, showing examples of positioning of terminal member 14 of the second embodiment. In one example, terminal member 14 is oriented so that the terminal member is separated from a peripheral member by a predetermined distance or more, and in the other example, terminal member 14 is oriented so that the terminal member is separated from a peripheral member by a predetermined distance or more and soldering of the terminal member is facilitated. Concretely, neighboring terminal members 14 are separated from each other by a predetermined distance or more, and the orientation of wire receiving portion 18 after the conductive caulking of terminal member 14 is varied. Due to such configurations, a necessary distance for insulating terminal members 14 from each other may be obtained. In any of sections (a) to (c), a movement path (indicated by an arrow 44) of a soldering iron used to solder each terminal member is oriented to the same direction, whereby the terminal members may be effectively soldered.

According to the present invention, since the conductive caulking of the terminal member and the winding wire may be carried out at a place where is separated from the connector or the terminal block, heat generated by the conductive caulking is not transferred to the connector or the terminal block, whereby melting or deterioration of the components may be avoided. Further, since the terminal member is directly connected to the connector or the terminal block by soldering, another connecting member, etc., is not necessary, whereby the number of components and the cost of the motor structure may be reduced.

By constituting a portion of the terminal member, connected to the connector or the terminal block, as the rod portion, and forming the hole portion, into which the rod portion may be inserted, on the connector or the terminal block, the soldering operation can be easily carried out by using a structure which is so-called a solder cup.

By constituting the terminal member so that the radial cross-section of the rod portion thereof is non-circular, the positional relationship between the wire receiving portion and the rod portion after the conductive caulking can be easily constant.

By aligning the terminal members at a predetermined or more intervals and properly changing the orientation of the terminal member when the terminal member is inserted into the connector or the terminal block, a certain distance between each terminal block can be obtained and the soldering operation is facilitated.

When the radial cross-section of the rod portion of the terminal member partially corresponds to a radial cross-section of the hole portion as a circumscribing circle of the rod portion so that a gap is formed between the hole portion and the rod portion inserted into the hole portion, the solder can easily flow within the hole portion, whereby the soldering may be properly carried out without enclosing air within the hole portion.

By forming the counterbore at the open end of the hole portion of the connector or the terminal block, the solder is prevented from flowing out of the hole portion, and/or a soldering condition can be properly controlled.

By arranging the rotation-stopping structure at the hole portion of the connector or the terminal block, the simultaneous rotation of the terminal member and the hole portion can be avoided after soldering the terminal member, whereby an insulating distance between each terminal member may be obtained. Further, the operation during soldering can be facilitated.

While the invention has been described with reference to specific embodiments chosen for the purpose of illustration, it should be apparent that numerous modifications could be made thereto, by a person skilled in the art, without departing from the basic concept and scope of the invention.

The invention claimed is:

1. A motor structure having a motor wherein a winding wire is wound onto a stator core and an end of the winding wire is connected to a connector or a terminal block,
    wherein a terminal member attached to the end of the winding wire is directly connected to the connector or the terminal block by soldering,
    wherein the terminal member has a wire receiving portion at one end thereof and a connecting portion at the other end thereof, the end of the winding wire is received in the wire receiving portion and is fixed by conductive caulking, and the connecting portion is directly connected to the connector or the terminal block,
    wherein the connecting portion of the terminal member is a rod portion, and the connector or the terminal block has a hole portion into which the rod portion may be inserted, such that the rod portion is inserted into the hole portion and soldered,
    wherein a solder cup having the hole portion is arranged on the connector or the terminal block, and
    wherein the solder cup is substantially filled with a solder.

2. The motor structure as set forth in claim 1, wherein a cross-sectional shape of the rod portion of the terminal member is non-circular.

3. The motor structure as set forth in claim 1, wherein the terminal member is oriented so that the terminal member is separated from a peripheral member by at least a predetermined distance, or the terminal member is oriented so that the terminal member is separated from a peripheral member by at least a predetermined distance and soldering of the terminal member is facilitated.

4. The motor structure as set forth in claim 2, wherein the hole portion of the connector or the terminal block has a cylindrical shape, and the radial cross-section of the rod portion of the terminal member partially corresponds to a radial cross-section of the hole portion as a circumscribing circle of the rod portion so that a gap is formed between the hole portion and the rod portion inserted into the hole portion.

5. The motor structure as set forth in claim 4, wherein the hole portion of the connector or the terminal block has a counterbore at an open end thereof, a diameter of which is larger than a diameter of the hole portion.

6. The motor structure as set forth in claim 5, wherein the hole portion of the connector or the terminal block has a rotation-stopping structure configured to not be rotated with the terminal member soldered to the hole portion.

7. A motor structure having a motor wherein a winding wire is wound onto a stator core and an end of the winding wire is connected to a connector or a terminal block,
wherein a terminal member attached to the end of the winding wire is directly connected to the connector or the terminal block by soldering,
wherein the terminal member has a wire receiving portion at one end thereof and a connecting portion at the other end thereof, the end of the winding wire is received in the wire receiving portion and is fixed by conductive caulking, and the connecting portion is directly connected to the connector or the terminal block,
wherein the connecting portion of the terminal member is a rod portion, and the connector or the terminal block has a hole portion into which the rod portion may be inserted, such that the rod portion is inserted into the hole portion and soldered,
wherein the terminal member is oriented so that the terminal member is separated from a peripheral member by at least a predetermined distance, or the terminal member is oriented so that the terminal member is separated from a peripheral member by at least a predetermined distance and soldering of the terminal member is facilitated,
wherein a solder cup having the hole portion is arranged on the connector or the terminal block, and
wherein the solder cup is substantially filled with a solder.

8. The motor structure as set forth in claim 1, wherein a longitudinal extension of the end of the winding wire arranged to be in parallel with an axial extension of the connector or the terminal block.

9. A motor structure having a motor wherein a winding wire is wound into a stator core and an end of the winding wire is connected to a connector or a terminal block,
wherein a terminal member attached to the end of the winding wire is directly connected to the connector or the terminal block by soldering,
wherein the terminal member has a wire receiving portion at one end thereof and a connecting portion at the other end thereof, the end of the winding wire is received in the wire receiving portion and is fixed by conductive caulking, and the connecting portion is directly connected to the connector or the terminal block,
wherein the connecting portion of the terminal member is a rod portion, and a shape of a radial cross-section of the rod portion of the terminal member is non-circular,
wherein the hole portion of the connector or the terminal block has a cylindrical shape, and the radial cross-section of the rod portion of the terminal member partially corresponds to a radial cross-section of the hole portion as a circumscribing circle of the rod portion so that a gap is formed between the hole portion and the rod portion inserted into the hole portion,
wherein a solder cup having the hole portion is arranged on the connector or the terminal block, and
wherein the solder cup is substantially filled with a solder.

10. The motor structure as set forth in claim 1, wherein a radial cross-section of the wire receiving portion is larger than a radial cross-section of the rod portion.

11. The motor structure as set forth in claim 7, wherein a radial cross-section of the wire receiving portion is larger than a radial cross-section of the rod portion.

12. The motor structure as set forth in claim 9, wherein a radial cross-section of the wire receiving portion is larger than a radial cross-section of the rod portion.

13. The motor structure as set forth in claim 1, wherein a center axis of the wire receiving portion is offset from a center axis of the rod portion.

14. The motor structure as set forth in claim 7, wherein a center axis of the wire receiving portion is offset from a center axis of the rod portion.

15. The motor structure as set forth in claim 9, wherein a center axis of the wire receiving portion is offset from a center axis of the rod portion.

* * * * *